United States Patent Office 3,420,143
Patented Jan. 7, 1969

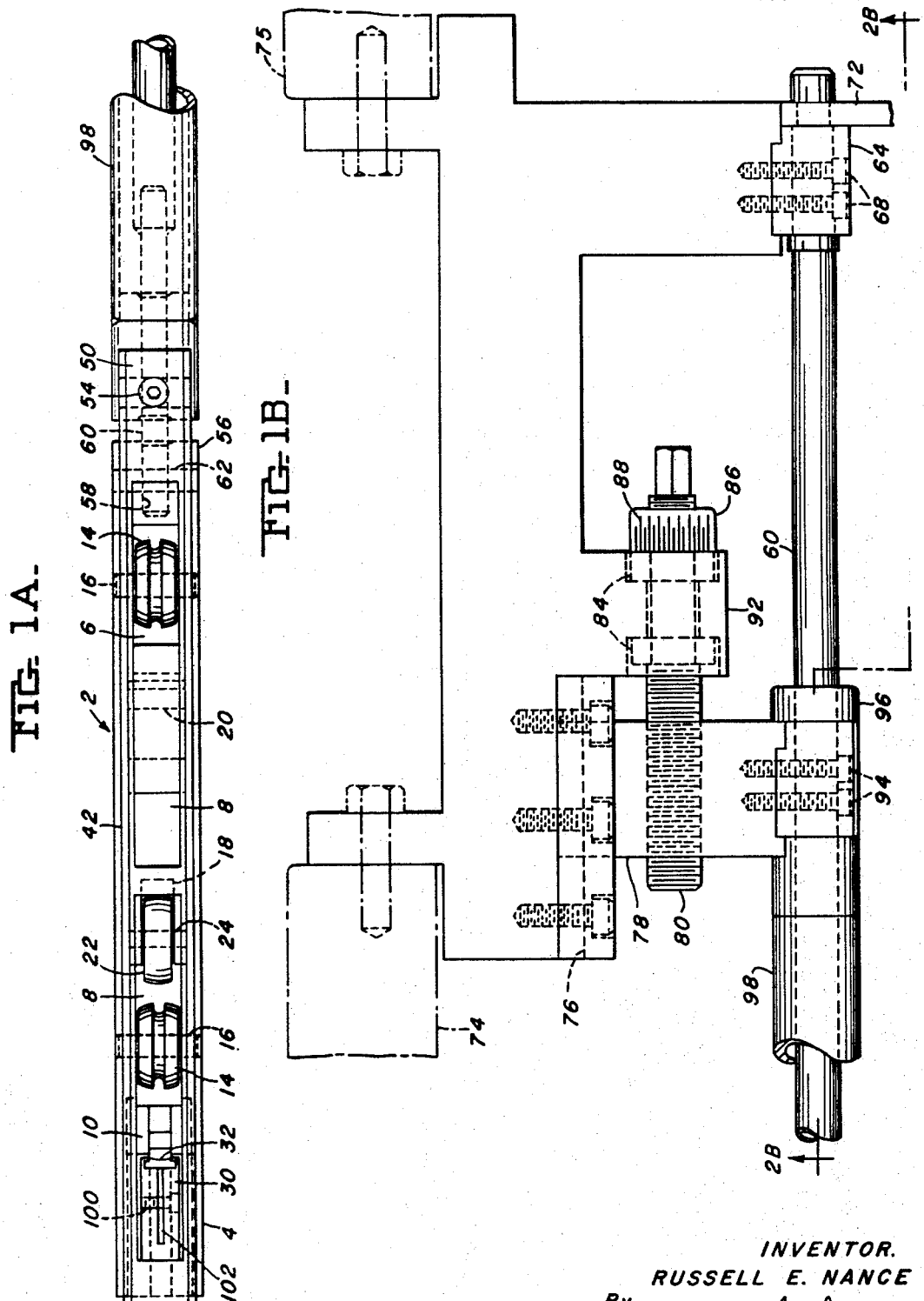

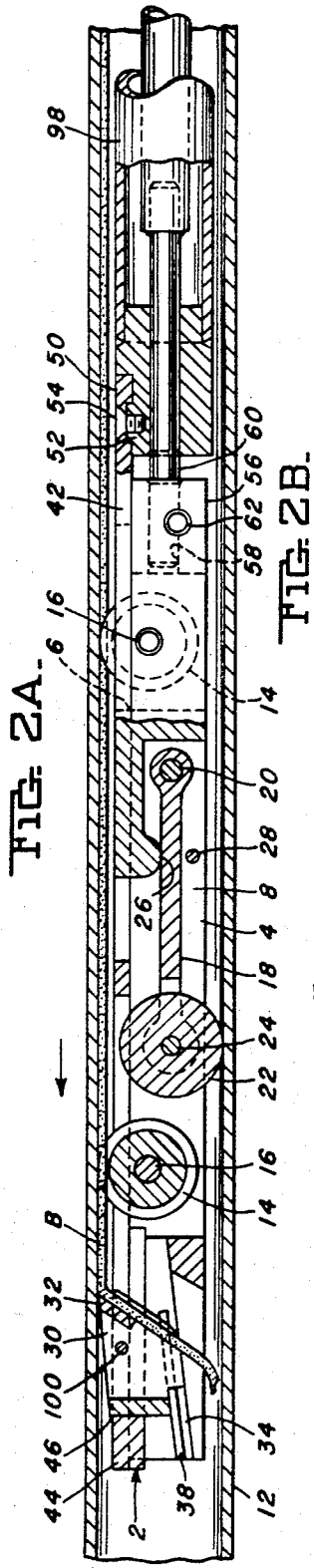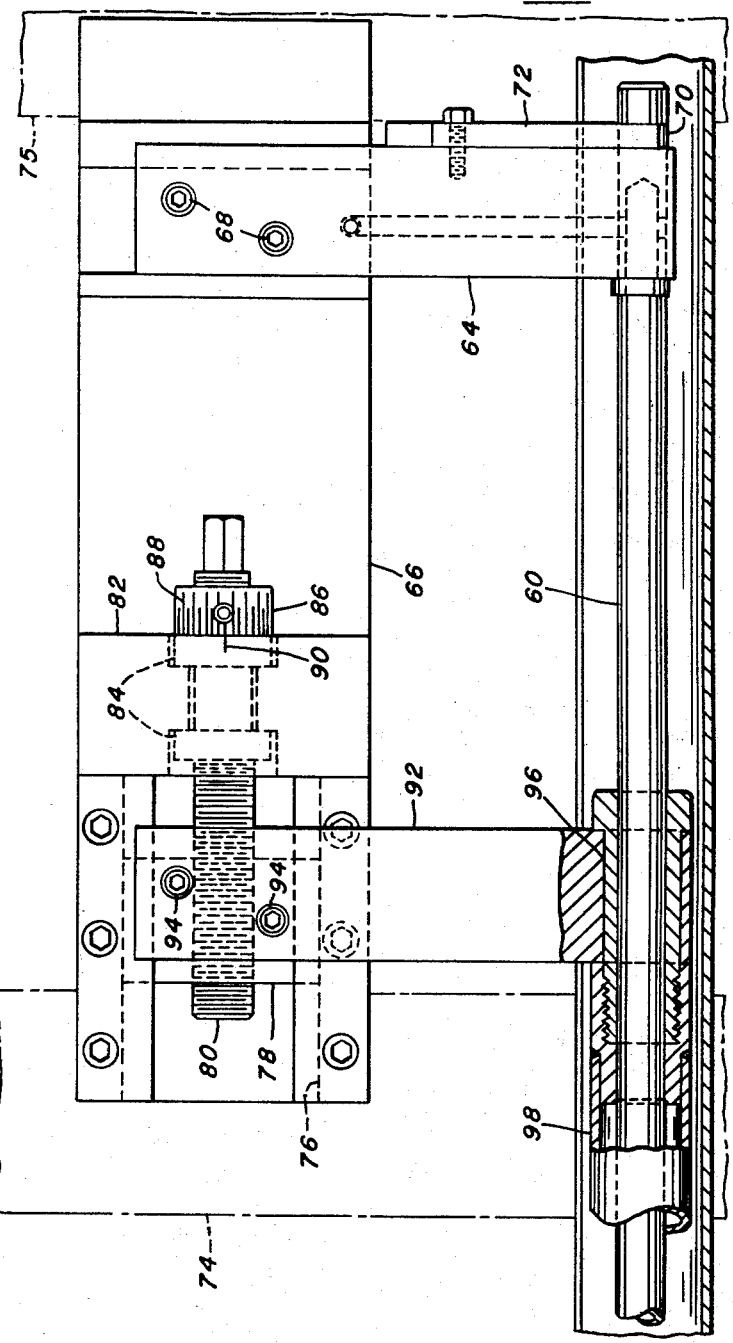

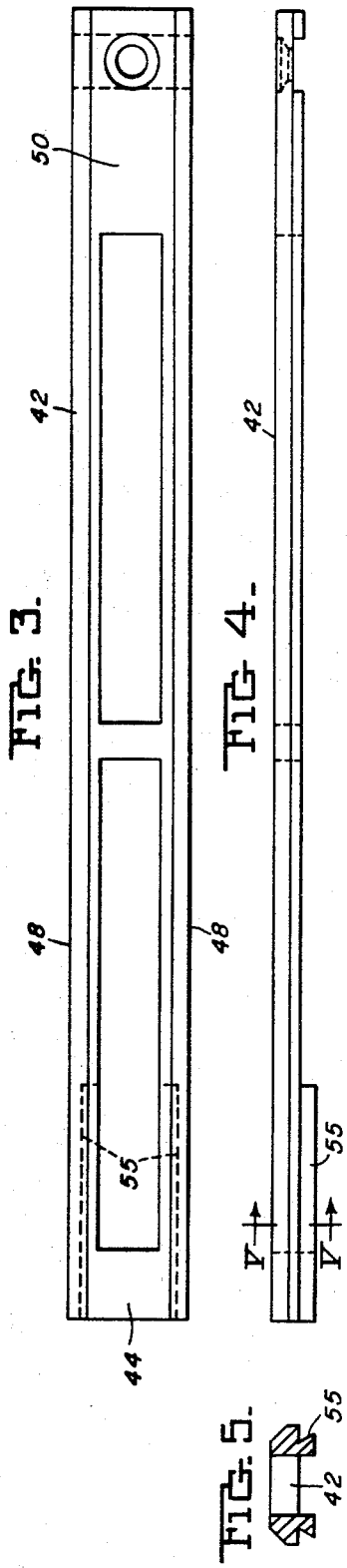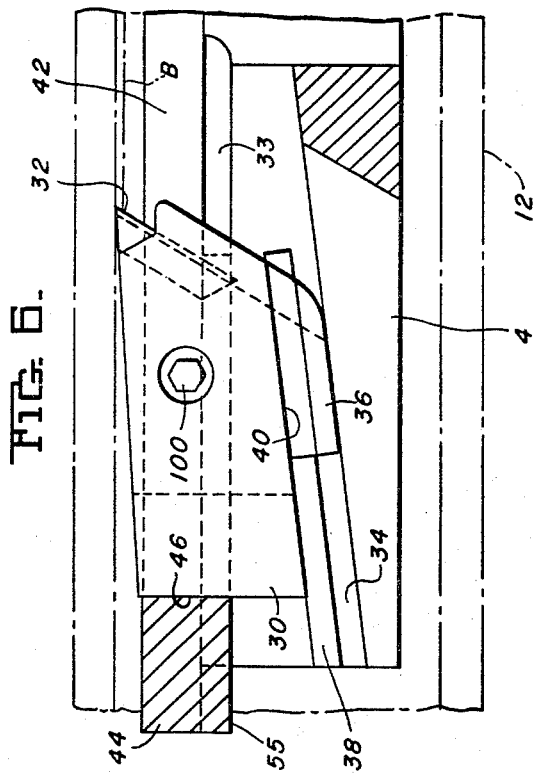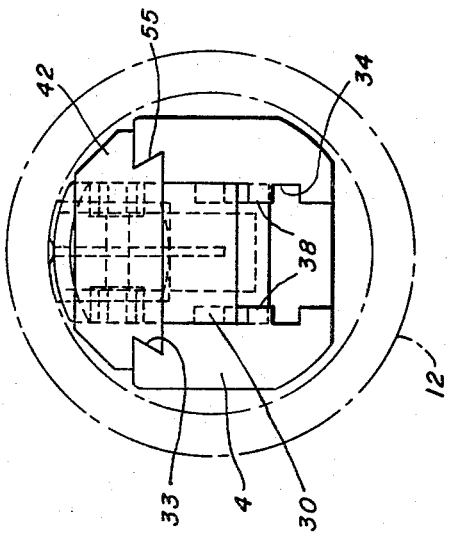

3,420,143
INSIDE FLASH TRIMMER WITH REMOTELY ADJUSTABLE CUTTER
Russell E. Nance, Portage, Ind., assignor to United States Steel Corporation, a corporation of Delaware
Filed Oct. 3, 1966, Ser. No. 583,812
U.S. Cl. 90—24                    5 Claims
Int. Cl. B23d 1/00

The present invention relates generally to apparatus for trimming the inside flash or burr from longitudinally welded metal pipe or tubing during the manufacture thereof, and more particularly to an inside flash trimmer having a remotely adjustable cutter element.

In the manufacture of electric resistance welded steel pipe, after the skelp or strip has been shaped into preliminary tubular form having an open seam, the spaced longitudinal edges are heated to a fusion temperature and forced together by pressure rolls to produce a continuous monolithic weld of the seam. As the butting edges are forced together, hot metal is extruded both outwardly and inwardly of the pipe to form a continuous burr or flash along the weld. The height, thickness, and conformity of this burr or flash varies according to pipe size, width and thickness of the skelp or strip, variations in welding conditions, and the shape of the welding throat.

The removal of the flash from the outside surface of the pipe is relatively simple and may be done by any one of several conventional methods. However, trimming the flash formed on the inner surface of the pipe is more difficult and gives rise to problems that are particularly serious in high-speed continuous production of welded pipe where it is highly desirable to trim the flash in the production line during the manufacture of the pipe. Various devices have been designed for trimming the inside flash of welded pipe during manufacture, but none prior to my invention have proved entirely satisfactory since none, to my knowledge, were so constructed that the cutter of the device could be adjusted during operation to compensate for wearing of the cutter edge. With prior art flash trimming devices with which I am familiar, it was necessary to interrupt the pipe-producing operation and cut a hole in the pipe to gain access to the cutter so that it could be adjusted to compensate for wear in the cutting edge. This resulted not only in loss of production, but also created scrap and product having a length less than that required.

It is, accordingly, an object of my invention to provide an inner flash trimmer having a cutter which is adjustable from a remote station whereby cutter adjustments can be made during continuous tube manufacturing operations with no interruptions of production.

It is a more specific object of my invention to provide an inside flash trimmer having a cutter tool shank installed adjacent one end thereof on an inclined way; and cutter adjusting means in the form of a transverse bar effective to engage the cutter tool shank and slide it upwardly to position the cutter edge closer to the inside flash or burr; and means connected with the bar and extending to a point remote from the flash trimmer body for manipulating the bar to adjust the cutter tool shank.

These and other objects will become more apparent from the following description of my invention and the enclosed drawings in which:

FIGURE 1A is a plan view of one end portion of the flash trimmer cutter adjusting arrangement of the invention;

FIGURE 1B is a plan view continuation of FIGURE 1A showing the other end of the flash trimmer cutter adjusting arrangement of the invention;

FIGURE 2A is an elevational view partly in section showing the flash trimmer of FIGURE 1A operatively disposed in a pipe;

FIGURE 2B is an elevational view partly in section taken along the line 2B—2B of FIGURE 1B with a showing of the partially formed pipe added;

FIGURE 3 is a plan view of the adjusting plate element of the invention;

FIGURE 4 is a front elevational view of FIGURE 3;

FIGURE 5 is a cross-sectional view taken along the line V—V of FIGURE 4;

FIGURE 6 is an enlarged partial view showing the disposition of the tool cutter shank of the flash trimmer relative to the mandrel body; and FIGURE 7 is an end view looking at the left end of FIGURE 6.

Referring more particularly to the drawings, reference numeral 2 designates generally a flash trimmer having a cutter tool shank installed therein in accordance with the invention. The flash trimmer 2 comirses a mandrel body 4 having a plurality of recesses 6, 8, and 10 spaced axially therealong. Flash trimmer 2 is shown in operative position within a longitudinally welded metal pipe 12 in FIGURE 2A for removing an inner burr or flash B.

Grooved rollers 14 are mounted on fixed shafts 16 which extend transversely of the mandrel body 4 and are disposed in recesses 6 and 8 of the body. A roller carriage 18 is disposed in part of recess 8 and is pivotally mounted at one end by a pin 20 which extends transversely of the body 4. The body of the roller carriage 18 is made of spring material and is bifurcated at the end thereof remote from its pivoted end to accommodate a pressure roller 22 which is mounted in the roller carriage by means of a transversely extending pin 24. An inwardly extending pressure bearing 26 is formed in the recess 8 integral with body 4 which bears against the roller carriage 18 at a point intermediate its pivoted end and its longitudinal center so as to constantly urge the pressure roller 22 against the inner wall of the pipe 12. Downward pressure of the roller 22 against the pipe wall forces the rollers 14 against the opposite wall of the pipe astride the burr B. The spring action of the roller carriage 18 allows the mandrel body 4 to accommodate itself to small differences in the inside diameter of the welded metal tube. A transverse pin 28 may be spaced under the pressure bearing 26 for limiting the downward movement of the roller carriage 18 so that the roller carriage will remain in substantially horizontal position when the flash trimmer is not in operation within a pipe.

Recess 10 of the mandrel body 4 has an open end and accommodates a cutting tool shank 30 which is provided with an upwardly projecting cutter insert 32 of suitable composition and shape to trim the inside burr B as the welded metal pipe 12 is advanced over the mandrel body 4 in the direction indicated by the arrow in FIGURE 2A. The top of the mandrel body along the sides of the recess 10 is formed in the shape of a longitudinally extending dove-tail way 33 for a purpose which will become apparent. The bottom of the recess 10 is formed with an inclined way 34 which projects upwardly and inwardly from the end of the mandrel body 4.

The tool shank 30 is formed with laterally projecting bottom lugs 36 which are received in the inclined way 34. A pair of opposed lugs 38, inclined similarly to way 34, are formed on the walls of the recess 10 which are received in inclined slots 40 formed on opposite sides of the tool shank 30 to guide the tool shank when it is moved along the inclined way 34.

An elongated adjusting plate 42 having a transverse bar portion 44 at one end is slidably mounted on the top of the mandrel body 4 with the bar portion engaging the outer end 46 of the tool shank 30. The adjusting plate 42 includes two spaced apart, parallel arms 48 which extend from the bar portion 44 to a cross member 50 which is connected with a block 52 adjacent the end of mandrel body 4 remote from recess 10 by means of a screw 54. A dove-tail key 55 is formed on the plate 42 underlying the bar portion 44 and extends a short distance along the undersides of the arms 48 in the direction toward the block 52. The key 55 fits into and is adapted to travel along the dove-tail way 33.

The end 56 of the mandrel body 4 remote from the recess 10 is provided with a longitudinal bored hole 58 for receiving the end of a mandrel rod 60 which is held connected to the mandrel body by means of a transversely extending pin 62. The block 52 is slidably disposed on the mandrel rod 60.

The mandrel rod 60 extends longitudinally away from the mandrel body 4 to a rigid connection with one end of a holder arm 64 which is rigidly mounted at its opposite end on a fixed bracket 66 by means of cap screws 68. The end of the mandrel rod 60 projects beyond the holder arm 64 and is provided on its projecting end with opposed slots 70 for receiving the bifurcated end of a keeper 72 which is rigidly attached to the arm 64 and holds the mandrel rod 60 in a longitudinally stationary position. The bracket 66 is fixedly mounted on the last forming roll stands 74 and 75 of the pipe producing line upstream from the electric resistance welder (not shown).

Bracket 66 is provided with a dove-tail way 76 for receiving a slide 78 which is threaded on an adjustment screw 80. Bracket 66 is provided with a portion 82 which rotatably accommodates the adjustment screw 80. Opposed thrust bearings 84 circumferentially disposed on the adjustment screw are provided on the bracket portion 82. A collar 86 is provided to the adjustment screw 80 disposed against the outer thrust bearing 84, as best shown in FIGURE 2B. The collar 86 is provided with graduated indicia lines 88. The collar 86, being pinned to the adjustment screw, will rotate with the adjustment screw when the latter is turned to make necessary adjustments, as will become apparent. The indicia line on the collar observed relative to a fixed mark 90 on the portion 82 of bracket 66 will indicate the amount of movement of the slide 78 along the way 76.

A holder arm 92 is mounted by one end to the slide 78 by means of cap screws 94. The opposite end of the holder arm 92 is provided with a bored hole to receive a connecting sleeve 96 which is threaded into a tool adjustment tube 98 which, in turn, is telescoped over the mandrel rod 60 and extends to a welded connection with the block 52.

In operation, the pipe 12 is formed from flat steel strip by the rolls in the forming stands and exits from the last forming stand with an open seam on its way to the seam closing and welding operation. The open seam permits the pipe to advance past the holding arm 64 and 92, as shown in FIGURE 2B.

The mandrel body 4 is held in longitudinally stationary position by the mandrel rod 60, the holder arm 64, and the keeper 72. The pressure bearing 26 engaging the spring body of the roller carriage 18 provides the tension required for vertically supporting the flash trimmer within the pipe. The grooved rollers 14 engage the burr B and guide the pipe as it travels over the cutting edge of the insert 32 projecting from the tool shank 30. The cutting edge of the insert 32 is contour ground to the inside radius of the pipe 12 and is held in the tool shank by means of a bolt 100 which extends transversely through the shank 30 and a projection 102 extending from the insert, as best shown in FIGURE 1A.

The position of the cutting edge of the insert 32 relative to the burr B may be changed at any time during a production run by turning the adjustment screw 80 clockwise or counter-clockwise to slide the tool shank 30 along the inclined way 34 of the recess 10 for elevating or lowering the cutter tool to any required cutting position. For example, if the flash trimmer is not removing enough of the burr B due to a worn cutting edge on the insert 32 and it is necessary to raise the cutting tool shank closer to the burr, a clockwise turn of the adjustment screw 80 of a desired amount moves the slide 78 to the right, as viewed in FIGURE 2B, which movement will cause the tool adjustment tube 98 and the adjusting plate 42 to move to the right forcing the tool shank 30 upwardly along the inclined way 34 under forward pressure of the bar portion 44, thus setting the cutting edge of the insert 32 closer to the inner wall of the pipe 12 so that more of the burr is removed as the pipe travels over the flash trimmer. If it is desired to remove less of the burr, the adjustment screw 80 is turned in counter-clockwise direction which will cause movement of the slide 78 and the holder arm 92 together with the tool adjustment tube 98 and adjusting plate 42 to the left a desired amount. This will cause the bar portion 44 of the adjusting plate 42 to move away from engagement with the outer end 46 of the tool shank 30 a desired amount. This, in turn, will cause the tool shank 30 to be moved downwardly along the inclined way 34 by the advancing pipe until the outer end 46 thereof again abuts the bar portion 44.

It should now be apparent that I have accomplished the objects initially set forth. I have provided an improved inside flash trimmer cutter adjusting arrangement which effectively overcomes the various disadvantages and shortcomings of inside flash trimmer cutter adjusting arrangements heretofore known by and available to the public. I have provided a cutter adjusting arrangement which makes it possible to adjust the cutting effectiveness of a flash trimmer in a pipe producing line without the necessity of interrupting the operation of the line.

Although I have shown but one embodiment of my invention, it will be apparent that other adaptations and modifications may be made without departing from the scope of the following claims.

I claim:

1. In an apparatus for trimming a flash bead on the inner surface of a longitudinally welded metal tube; said trimming apparatus including an elongated body adapted to be disposed within the tube so as to permit relative longitudinal motion between the body and the tube, rigid supporting means for said body, said body having a recess adjacent one end, a tool shank disposed in said recess, and a cutting tool disposed in said tool shank with its cutting edge projecting therefrom in the plane of said flash bead whereby relative longitudinal motion between said body and said tube results in the trimming of said flash bead by said cutting tool, wherein the improvement comprises an inclined way in said recess, said tool shank being slidable on said way, a transverse bar mounted on said body and being movable longitudinally along the body, said transverse bar engaging said tool shank, manipulating means attached to said bar and extending longitudinally along said body to a point remote from the body, said manipulating means in cooperation with said transverse bar being operable from said remote point to move said tool shank upwardly along said inclined way and hold it in a selectively adjusted position.

2. Apparatus as defined by claim 1 in which said bar manipulating means includes a fixed bracket, an arm mounted for adjustable movement along said bracket, and an elongated connecting member rigidly connected with and extending between said bar and said arm.

3. Apparatus as defined by claim 2 including indicia means on said bracket connected with said arm for indicating the amount of movement of said arm along said bracket.

4. Apparatus as defined by claim 1 characterized by said body and said bar manipulating means being secured respectively to elongated members telescoped one within the other, fixed means supporting one of said elongated members, and adjustable means supporting the other.

5. Apparatus as defined by claim 4 in which said body-secured elongated member is supported by said fixed means and said bar manipulating means-secured elongated member is supported by said adjustable means.

References Cited

UNITED STATES PATENTS

| | | | |
|---|---|---|---|
| 2,025,422 | 12/1935 | Park | 90—24.02 |
| 3,177,776 | 4/1965 | Marhanka | 90—24.02 |
| 3,352,208 | 11/1967 | Thomas et al. | 90—24 |

ANDREW R. JUHASZ, *Primary Examiner.*

G. WEIDENFELD, *Assistant Examiner.*